(12) United States Patent
Henaut et al.

(10) Patent No.: US 7,757,702 B2
(45) Date of Patent: Jul. 20, 2010

(54) METHOD OF OPTIMIZING HEAVY CRUDE PIPELINE TRANSPORTATION

(75) Inventors: Isabelle Henaut, Rueil Malmaison (FR); Loïc Barre, Gif sur Yvette (FR); Patrick Gateau, Maurepas (FR); Jean-François Argillier, Saint Cloud (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 930 days.

(21) Appl. No.: 10/549,038

(22) PCT Filed: Mar. 10, 2004

(86) PCT No.: PCT/FR2004/000567

§ 371 (c)(1),
(2), (4) Date: Nov. 2, 2006

(87) PCT Pub. No.: WO2004/085913

PCT Pub. Date: Oct. 7, 2004

(65) Prior Publication Data

US 2007/0175512 A1 Aug. 2, 2007

(30) Foreign Application Priority Data

Mar. 17, 2003 (FR) .................................. 03 03275

(51) Int. Cl.
*F17D 1/17* (2006.01)

(52) U.S. Cl. ........................................ 137/13; 516/141
(58) Field of Classification Search ................... 137/13; 516/141

See application file for complete search history.

(56) References Cited

U.S. PATENT DOCUMENTS

| | | | | |
|---|---|---|---|---|
| 3,467,195 | A * | 9/1969 | Johnson, Jr. et al. | 137/13 |
| 4,285,356 | A | 8/1981 | Sifferman | |
| 4,333,488 | A * | 6/1982 | McClaflin | 137/13 |
| 4,355,651 | A | 10/1982 | McClaflin | |
| 4,570,656 | A | 2/1986 | Matlach et al. | |
| 4,684,372 | A | 8/1987 | Hayes et al. | |
| 4,978,365 | A * | 12/1990 | Gregoli et al. | 137/13 |
| 4,993,448 | A * | 2/1991 | Karydas et al. | 137/13 |
| 5,008,035 | A | 4/1991 | Broom | |
| 6,054,496 | A * | 4/2000 | Crane et al. | 137/13 |
| 6,178,980 | B1 * | 1/2001 | Storm | 137/13 |
| 2007/0185219 | A1 * | 8/2007 | Argillier et al. | 516/141 |

* cited by examiner

*Primary Examiner*—John Rivell
(74) *Attorney, Agent, or Firm*—Antonelli, Terry, Stout & Kraus, LLP.

(57) ABSTRACT

Heavy crude transportation optimization method wherein at least one solvent consisting of a petroleum cut is added to said crude. According to the method, the polar component $\delta_p$ of the Hildebrand parameter of the solvent is increased, and the contribution of hydrogen bond $\delta_h$ of the Hildebrand parameter of the solvent is controlled, by adding a predetermined amount of at least one specific additive.

20 Claims, No Drawings

METHOD OF OPTIMIZING HEAVY CRUDE PIPELINE TRANSPORTATION

FIELD OF THE INVENTION

The invention relates to the sphere of production of heavy crudes which notably have the drawback of too high a viscosity. The object of the method according to the invention is to reduce the pressure drop during heavy crude pipeline transportation by acting on the viscosity thereof.

BACKGROUND OF THE INVENTION

Heavy oils are defined as crude oils whose API gravity is below 20. These oils, the world reserves of which are of the same order as for conventional oils, are characterized by a high asphaltene content and by a high viscosity that can reach up to a million centipoises at reservoir temperature. Their transportation by pipeline is therefore much more difficult than in the case of conventional crudes. Heavy crude pipeline transportation implies that the viscosity is sufficiently low considering the dimension of the transportation lines and the power of the pumping installations, selected in accordance with the economic optimum.

There are various methods known to the man skilled in the art that allow heavy oil pipeline transportation. These methods are, for example, heating, dilution, bringing into aqueous emulsion, core annular flow, or partial crude refining on the production site before transportation.

Heating is an effective way of reducing notably the viscosity of heavy oils. However, depending on the characteristics of the crude to be transported, it may be necessary to bring the fluid to relatively high temperatures, sometimes above 100° C., to obtain a viscosity compatible with industrial plants. Furthermore, it is important to maintain the temperature of the fluid at this level all along the line, which implies thermal insulation of the lines and sometimes installation of heating units combined with the pumping installations.

Emulsification of crude in water is also currently used. In this technique, the crude is transported in form of fine droplets in a continuous phase mainly consisting of water. In order to guarantee emulsion stability all along the pipeline, it is necessary to add judiciously selected surfactants to the water. These surfactants must also allow, in a simple manner, both inversion of the emulsion upon arrival at the refinery and recovery of the anhydrous crude, and treatment of the polluted water.

Core annular flow consists in transporting the crude surrounded by a water film. This is the most effective method for reducing pressure drops, which are almost comparable to those obtained with water. This technique is for example described in patent U.S. Pat. No. 4,753,261. However, this method involves difficulties related to the flow stability, fouling of the pipeline walls in the course of time and notably restarting difficulties in case of non programmed production stop, which is why this transportation mode has not been used much up to now.

Another method that can be considered for bringing the viscosity of a crude to a value compatible with pipeline transportation is partial refining on the production site. An example is given in patent U.S. Pat. No. 5,110,447. This method requires considerable investments and high operating costs due to the increase in the number of visbreaking units on the site.

In order to reduce the viscosity of heavy oils, they are commonly diluted by means of solvents. The solvents used are hydrocarbon cuts such as condensates or naphtha. This method is based on the fact that the viscosity of heavy crudes is greatly reduced when adding a solvent of low viscosity. It is generally admitted that, in order to obtain a sufficient viscosity reduction to allow pipeline transportation of a heavy oil, the amount of light solvent to be added ranges between 10 and 50% by volume. When this method is used, it most often comprises a second pipeline allowing to recycle the solvent after distillation separation at the refinery. This method can be regarded as the most effective for heavy crude transportation. Despite considerable investment, it allows oil to be transported without particular risks, even in case of prolonged production stop. Furthermore, diluting the crude facilitates certain operations such as separation of the production water. However, the volume to be transported is increased, and the cost of the solvent and of its possible separation from the crude in order to recycle it is not insignificant.

One possible improvement to the dilution of heavy crudes consists in improving the method so as to obtain the viscosity required for pipeline transportation using a lower volume of solvent.

SUMMARY OF THE INVENTION

The present invention thus relates a method of optimizing heavy crude transportation, wherein at least one solvent consisting of a petroleum cut is added to said crude. According to the invention, the polar component $\delta_p$ of the Hildebrand parameter of said solvent is increased, and the contribution of hydrogen bond $\delta_h$ of the Hildebrand parameter of the solvent is controlled, by adding a predetermined amount of at least one specific additive.

The additive can have a boiling temperature lower than 150° C.

The additive can have a polar component $\delta_p$ of the Hildebrand parameter above 5 $(MPa)^{1/2}$, and preferably above 8 $(MPa)^{1/2}$.

The additive can have a contribution of hydrogen bond $\delta_h$ of the Hildebrand parameter lower than 6.5 $(MPa)^{1/2}$.

The additive can be selected from among: ethers, ketones, aldehydes, esters, nitriles, or mixtures thereof.

The additive can comprise 2-butanone.

The amount of the at least one specific additive can be between 1 and 50% by volume of additive in relation to the solvent.

The amount of the at least one specific additive can be between 10 and 20% by volume of additive in relation to the solvent.

The method can comprise a step of recovery of said additive by distillation.

The solvent can be recovered by distillation.

The object of the present invention is to improve the method of diluting a heavy crude. It has been shown that a change in the solubility parameters of the solvent used, in particular an increase in the polarity of the solvent, leads to a notable improvement in the dilution efficiency of the solvent considered. Moreover, the contribution of the hydrogen bonds $\delta_h$ must be controlled, notably because of possible miscibility difficulties.

The Hansen parameters (Hansen, C. M., The universality of the solubility parameter, *Ind. Eng. Chem. Prod. Res. Dev.*, 8, 2, 1969) are an extension of the Hildebrand parameter (Hildebrand, J. H., and Scott, R. L., *Solubility of Non-Electrolytes*, $3^{rd}$ Ed. Reinhold, N.Y., 1950; Dover, N.Y., 1964). They are related thereto by the relation:

$$\delta_t^2 = \delta_d^2 + \delta_p^2 + \delta_h^2$$

wherein $\delta_t$ corresponds to the Hildebrand parameter, $\delta_d$ corresponds to the dispersion forces, $\delta_p$ to the polar component and $\delta_h$ to the contribution of the hydrogen bonds.

In case of a mixture S of n solvents $S_{(i)}$ (i=1, n) in volume proportions $V_{(i)}$ (i=1, n), with $$\sum_{i=1}^{i=n} V_{(i)} = 1,$$

the Hansen parameters of this mixture of solvents S are:

$$\delta_d = \sum_{i=1}^{i=n}(\delta_{d(i)} \times V_i) \quad \delta_p = \sum_{i=1}^{i=n}(\delta_{p(i)} \times V_i) \quad \delta_h = \sum_{i=1}^{i=n}(\delta_{h(i)} \times V_i)$$

The petroleum hydrocarbons commonly used to dilute heavy crudes have Hansen parameters whose polar component is low, typically below 0.8 $(MPa)^{1/2}$. For example, for the ASTM fuel "B": $\delta_p$ is 0.4 $(MPa)^{1/2}$, $\delta_h$ is 0.6 $(MPa)^{1/2}$ (Allan F. M. Barton, *Handbook of Solubility Parameters and Other Cohesion Parameters*, CRC Press, 1991).

The present invention proposes increasing parameter $\delta_p$ of the solvent so as to improve its efficiency. One, or a mixture of several additives having a parameter $\delta_p$ above 5 $(MPa)^{1/2}$ are therefore added to the hydrocarbon solvent in a volume proportion ranging between 1 and 50%, preferably between 5 and 50%. These additives of high polarity can be selected from among ethers, ketones, aldehydes, esters, nitrites or mixtures of several of these products, on condition that these products or product mixtures are sufficiently miscible with the solvent. Additionally, it has been verified that the parameter $\delta_h$ of the additive must be lower than 7 $(MPa)^{1/2}$, and preferably lower than 6.5 $(MPa)^{1/2}$ for a better efficiency.

According to the present invention, the method of optimizing heavy crude transportation comprises also a process of recovery of the additive or its mixture by distillation. For the process to be efficient, the boiling temperature of the additive must be lower than the final distillation point of the cut. It could be even preferred that the additive can be recovered partially in the lower part of the temperature range of the cut or even better at lower temperature than the initial boiling point of the solvent. For example using the Varsol 3135 Naphtha from ExxonMobil the additive should have a boiling temperature (BP) lower than 180° C. (final boiling point) and preferably lower than 150° C. (initial boiling point).

This method can also be applied for transportation of extra-heavy oil, bitumen and any heavy residue obtained from distillation operations in a refining unit.

The following examples illustrate the invention without however limiting it to these embodiments.

EXAMPLE 1

A heavy Venezuelan crude of density 8.5 API degrees, containing 17% asphaltenes (ASTM D6560), has a viscosity of 380 Pa·s at 20° C.

This crude is diluted with 15% by mass of a naphtha whose composition is given in Table 1.

TABLE 1

Chemical composition of the naphtha

| Family | % by weight |
|---|---|
| n-paraffins | 24.9 |
| Isoparaffins | 29.4 |
| Naphthenes | 30.9 |
| Aromatics | 14.8 |

The viscosity of the crude oil, measured at 20° C., is then 1.86 Pa·s.

EXAMPLE 2

A solvent consisting of 90% by volume of the naphtha used in example 1 and of 10% by volume of ethyl acetate, whose component $\delta_p$ of the Hildebrand parameter is 5.3 $(MPa)^{1/2}$, whose component $\delta_h$ of the Hildebrand parameter is 7.2 $(MPa)^{1/2}$ and boiling temperature (BP) is 77° C., is prepared. The polar component of this solvent is 0.9 $(MPa)^{1/2}$. The heavy crude of example 1 is diluted using 15% by mass of this solvent. The viscosity measured at 20° C. is then 1.56 Pa·s. A 17% improvement in the dilution efficiency is observed in this case.

EXAMPLE 3

A solvent consisting of 90% by volume of the naphtha used in example 1 and of 10% by volume of butyraldehyde, whose components $\delta_p$ and $\delta_h$ of the Hildebrand parameter are respectively 5.3 $(MPa)^{1/2}$ and 7 $(MPa)^{1/2}$ and whose boiling temperature (BP) is 75° C., is prepared. The polar component of this solvent is 0.9 $(MPa)^{1/2}$. The heavy crude of example 1 is diluted using 15% by mass of this solvent. The viscosity measured at 20° C. is then 1.59 Pa·s. A 15% improvement in the dilution efficiency is observed in this case.

EXAMPLE 4

A solvent consisting of 90% by volume of the naphtha used in example 1 and of 10% by volume of 1-butanol, whose component $\delta_p$ of the Hildebrand parameter is 5.7 (MPa), whose component $\delta_h$ of the Hildebrand parameter is 15.8 $(MPa)^{1/2}$ and boiling temperature (BP) is 118° C., is prepared. The polar component of this solvent is 0.9 $(MPa)^{1/2}$. The heavy crude of example 1 is diluted using 15% by mass of this solvent. The viscosity measured at 20° C. is then 1.63 Pa·s. A 12% improvement in the dilution efficiency is observed in this case.

EXAMPLE 5

A solvent consisting of 90% by volume of the naphtha used in example 1 and of 10% by volume of 2-butanone, whose component $\delta_p$ of the Hildebrand parameter is 9.0 $(MPa)^{1/2}$, whose component $\delta_h$ of the Hildebrand parameter is 5.1 $(MPa)^{1/2}$ and boiling temperature (BP) is 80° C., is prepared. The polar component of this solvent is 1.26 $(MPa)^{1/2}$. The heavy crude of example 1 is diluted using 15% by mass of this solvent. The viscosity measured at 20° C. is then 1.48 Pa·s. A 20% improvement in the dilution efficiency is observed in this case.

EXAMPLE 6

10% by volume of butyronitrile, whose polar component $\delta_p$ of the Hildebrand parameter is 12.5 $(MPa)^{1/2}$, whose component $\delta_h$ of the Hildebrand parameter is 5.1 (MPa)$^{1/2}$ and boiling temperature (BP) is 118° C., is added to the naphtha used in example 1, which allows to obtain a solvent whose $\delta_p$ value is 1.61 (MPa)$^{1/2}$. The viscosity of the crude used in example 1 diluted with 15% by mass of this solvent and measured at 20° C. is 1.48 Pa·s, which corresponds to a 20% dilution improvement.

EXAMPLE 7

Example 2 is repeated while adding this time 50% by volume of ethyl acetate to the naphtha, which allows to obtain a solvent whose $\delta_p$ value is 2.85 (MPa)$^{1/2}$. The viscosity measured at 20° C. of the crude of example 1 diluted with 15% by mass of this solvent is 1.14 Pa·s. In this case, the dilution efficiency is improved by 39%.

EXAMPLE 8

Example 5 is repeated while adding this time 50% by volume of 2-butanone to the naphtha, which allows to obtain a solvent whose $\delta_p$ value is 4.7 (MPa)$^{1/2}$. The viscosity measured at 20° C. of the crude of example 1 diluted with 15% by mass of this solvent is 0.873 Pa·s. In this case, the dilution efficiency is improved by 53%.

It is thus clear that, when modifying a base solvent by adding thereto an additive allowing to increase the polar component of the Hildebrand parameter, the solvent function is optimized, for the same amount of solvent. It is also clear that, for additives having similar polar component $\delta_p$, the lower the hydrogen contribution $\delta_h$, the better the dilution efficiency. From the results presented here, the additive or its mixture should have a polar component $\delta_p$ greater than 5, preferentially greater than 8 and a contribution of the hydrogen bonds $\delta_h$ lower than 7, preferentially lower than 6.5.

Dilution of the heavy crude can be carried out at the bottom of the production well, downstream from the wellhead at the surface, or in an intermediate transportation line.

The invention claimed is:

1. A method of optimizing heavy crude transportation, comprising adding at least one solvent comprising a petroleum cut and a predetermined amount of at least one additive to heavy crude, wherein the polar component $\delta_p$ of the Hildebrand parameter of of the at least one solvent is increased, and the contribution of hydrogen bond $\delta_h$ of the Hildebrand parameter of the solvent is controlled, by the predetermined amount of the at least one additive, and transporting the heavy crude diluted by the at least one solvent.

2. A method as claimed in claim 1, wherein the at least one additive has a boiling temperature lower than 150° C.

3. A method as claimed in claim 1, wherein the at least one additive has a polar component $\delta_p$ of the Hildebrand parameter above 5 (MPa)$^{1/2}$.

4. A method as claimed in claim 1, wherein the at least one additive has a contribution of hydrogen bond $\delta_h$ of the Hildebrand parameter lower than 6.5 (MPa)$^{1/2}$.

5. A method as claimed in claim 1, wherein the at least one additive is selected from the group consisting of ethers, ketones, aldehydes, esters, nitriles, and mixtures thereof that are sufficiently miscible with the petroleum cut.

6. A method as claimed in claim 1, wherein the at least one additive comprises 2-butanone.

7. A method as claimed in claim 1, wherein the amount of the at least one additive is between 1 and 50% by volume of additive in relation to the solvent.

8. A method as claimed in claim 7, wherein the amount of the at least one additive is between 10 and 20% by volume of additive in relation to the solvent.

9. A method as claimed in claim 1, further comprising a step of recovery of the at least one additive by distillation.

10. A method as claimed in claim 9, further comprising recovering the at least one solvent by distillation.

11. A method as claimed in claim 1, wherein the at least one additive has a polar component $\delta_p$ of the Hildebrand parameter above 5 (MPa)$^{1/2}$ and a contribution of hydrogen bond of $\delta_h$ of the Hildebrand parameter lower than 7 (MPa)$^{1/2}$.

12. A method as claimed in claim 1, wherein said additive has a contribution of hydrogen bond $\delta_h$ of the Hildebrand parameter lower than 6.5 (MPa)$^{1/2}$ and a polar component $\delta_p$ of the Hildebrand parameter above 8 (MPa)$^{1/2}$.

13. A method as claimed in claim 11, wherein the amount of the at least one additive is between 1 and 50% by volume of additive in relation to the solvent.

14. A method as claimed in claim 11, wherein the amount of the at least one additive is between 10 and 20% by volume of additive in relation to the solvent.

15. A method as claimed in claim 11, wherein the heavy crude has an API gravity below 20.

16. A method as claimed in claim 15, wherein the heavy crude is selected from the group consisting of extra-heavy oil, bitumen and heavy residue obtained from distillation operations in a refining unit.

17. A method as claimed in claim 11, wherein the at least one solvent is added to the heavy crude at a bottom of a production well.

18. A method as claimed in claim 11, wherein the at least one solvent is added to the heavy crude downstream from a wellhead at the surface.

19. A method as claimed in claim 11, wherein the at least one solvent is added to the heavy crude in an intermediate transportation line.

20. A method as claimed in claim 1, wherein the at least one additive has a contribution of hydrogen bond $\delta_h$ of the Hildebrand parameter lower than 6.5 (MPa)$^{1/2}$ and is selected from the group consisting of ethers, ketones, aldehydes, esters, nitriles and mixtures thereof.

* * * * *